Patented June 14, 1949

2,472,790

UNITED STATES PATENT OFFICE 2,472,790

METHOD OF PREPARING STARCH PASTE

James P. Casey, Decatur, Ill., assignor to A. E. Staley Manufacturing Company, Decatur, Ill., a corporation of Delaware No Drawing. Application April 20, 1946, Serial No. 663,748

11 Claims. (Cl. 195—66)

This invention relates to improvements in processes and starch compositions used in preparing fluid aqueous starch pastes. More specifically, it pertains to processes and starch compositions used in preparing such starch pastes by means of starch liquefying enzymes.

Starches are widely used in the preparation of binders, adhesives, coatings, and sizes, especially in the paper and textile industries. The natural or unmodified starches, when heated with water, yield pastes that are extremely viscous at relatively low concentrations or starch solids. For many purposes, such as in the preparation of an adhesive for making laminated paperboard, or of a binder for pigmented coatings, it is often desirable to use a starch paste containing a higher proportion of starch solids than can be provided by a sufficiently fluid paste of natural starch. Modified or so-called thin boiling starches were first developed to meet this demand. These starches yield much thinner pastes with hot water at a given starch solids content than do the corresponding unmodified starches. They may be prepared, for example, by treating the natural starches under carefully controlled conditions with oxidizing agents, heat, or acids.

Recently, starch liquefying enzymes have been used to thin out the excessively thick pastes of unmodified starch prior to their use. This method has become of commercial importance now that suitable enzymes are available in large quantities. It has the advantage of permitting the user of the starch paste to make up the paste as desired from low cost natural starch. But as commonly practiced, it has the inherent disadvantage that the starch paste passes through a troublesome thick stage before thinning out to the desired fluidity. The undesirable transient thickening can be reduced somewhat by increasing the proportion of starch-liquefying enzyme used, but this increases the cost of the operation.

In preparing the thinned pastes by enzyme treatment, the start is mixed with the desired proportion of water and required proportion of enzyme and then heated, preferably with agitation, to the converting temperature of the enzyme, which is usually about the same as the pasting temperature of the starch. As the temperature of the mixture approaches the pasting value, the starch swells and thickens the mixture at a rate much greater than the paste is thinned by the enzyme. The paste may become so thick that stirring becomes extremely difficult or practically impossible with ordinary types of mechanical agitators. Or, if the mixture is being heated and agitated by injected steam, this may have to be discontinued to avoid objectionable spattering of the thickened mass.

The enzyme conversion is relatively easy to carry out when the ratio of starch to water does not exceed about 1 to 4, as, for example, is the practice in the surface sizing of paper and textiles. For some purposes, however, it is desirable to use a starch paste wherein the ratio of starch to water is considerably in excess of 1 to 4, and occasionally as high as 1 to 1. When an attempt is made to prepare such concentrated pastes directly by heating a suitable slurry of starch, water, and enzyme, trouble is encountered due to the mixture becoming too viscous because of pasting of the starch at the converting temperature. This makes it very difficult or practically impossible to stir the paste and distribute the heat uniformly.

I have discovered that the objectionable thickening occurring in the foregoing preparation of concentrated fluid starch pastes can be overcome by using a mixture of starches, each of which starches has a substantially different pasting or enzyme-converting temperature. The mixture of starches, enzyme, and water is first heated, preferably while being agitated, to the lowest converting temperature of one of the starches and held there until one part of the starch mixture is pasted and the paste thinned out by the enzyme, then heating the mixture further to the next higher converting temperature of another of the starches and held there until a second fraction of the starch mixture is pasted and thinned out. Or, the slurry of starches, water, and enzyme may first be heated to the enzyme-converting temperature of the starch having the lowest enzyme-converting temperature, then slowly raised in temperature to the enzyme-converting temperature of the starch having the highest enzyme-converting temperature, and thereafter heated, at a temperature below the inactivation temperature of the enzyme, until the starches have been suitably thinned by the enzyme. In this way the mixture of starches in the slurry is pasted and thinned progressively, so that the maximum viscosity of the mixture during the entire operation is substantially less than it would be if all of the starches were pasted at once.

A principal object of this invention is to provide means for preventing the excessive and troublesome initial thickening of the pastes that occurs during the preparation of fluid concentrated pastes by the action of heat and starch liquefying enzymes on slurries of starch and water.

This and other objects of the invention will in part be obvious, and will in part appear hereinafter.

In carrying out the process of this invention, one may use a mixture of natural starches having different enzyme-converting temperatures. Preferably, however, there is used a mixture of natural starch with some of the same kind of starch modified in such a way that its enzyme-converting temperature is lowered. Or, one may use a mixture of portions of the same kind of starch so modified that their converting temperatures are substantially different.

For example, one may use a mixture of approximately equal parts of tapioca and corn starches. When such a mixture is heated with water and starch-liquefying enzyme, first to the converting temperature of tapioca starch, which is at about 150° F., then to the converting temperature of corn starch, at about 165° F., it will be found that the maximum viscosity of the starch paste attained during the process is much less than it would be if either of the two starches were used alone.

Or, one may use, for example, a mixture of about two parts of natural corn starch and about one part of the same kind of starch modified by milling on differential rolls. The converting temperature of the milled starch is about 15-20° F. below that of the unmodified corn starch, and, as with the mixture of natural tapioca and corn starches, the mixture of modified and unmodified corn starch can be pasted and thinned with enzyme with development of much less viscosity than occurs when either starch is used alone.

In general, starch-liquefying enzyme preparations, whose active component is commonly regarded as alpha amylase, attack or degrade ungelatinized starch very slowly. On the other hand, it is not necessary that the starch be completely gelatinized or pasted to a state of maximum viscosity before its paste can be thinned rapidly by the enzyme. As used herein, the expression "enzyme-converting temperature," when applied to a given starch, refers to the temperature at which the starch, in contact with water, will swell enough to allow relatively rapid thinning of the paste by the starch liquefying enzyme. This temperature is usually considerably less than the temperature at which the starch paste develops its maximum viscosity. It is related to the pasting or gelatinization temperature of the starch to the extent that if one starch has a lower pasting temperature than another, its enzyme converting temperature will also be less than that of the other.

Liquefaction, or thinning of starch by a starch-liquefying enzyme, is generally understood to mean a disorganization or degradation of the starch granule into smaller physical units which form a more stable dispersion in water than that of gelatinized, untreated starch. The most significant visible effect of the enzyme action is a reduction in the viscosity of the starch paste, and preferably this should be accompanied by a minimum production of reducing substances such as sugars and lower dextrins.

Preferably there should be a difference of not less than about 15° F. in the enzyme-converting temperature of any two components in the starch mixture being converted to a fluid paste by the process of this invention. This is desirable because the swelling and pasting of starch extends over a considerable temperature range. In mixtures of starches having enzyme converting temperatures much less than 15° F. apart, there is considerable overlapping of pasting, and a starch fraction with a higher enzyme converting temperature starts to swell and cause undesirable thickening of the mixture before the fraction with a lower converting temperature has been suitably liquefied by the enzyme.

It is known that most natural starches consist of granules of varying sizes, and that the large granules swell and paste at somewhat lower temperatures than do the small granules. This condition, however, does not permit the enzyme conversion of single natural starches at high ratios of starch solids to water without the occurrence of troublesome thickening. This is due to the fact that the differences between pasting temperatures of substantial fractions of the starch having uniform particle sizes are too small to prevent the development of excessive viscosity during conversion.

Any enzyme or enzyme preparation that will liquefy starch may be used in the practice of this invention. Among suitable enzyme preparations are the commercial amylolytic ones derived from such sources as malt, fungi, pancreas, and bacteria. The different enzyme preparations differ somewhat in their effects on starch paste, but all have the common ability to thin the paste when added thereto in small proportions, especially at elevated temperatures. They are sold in both the dry and liquid states.

The proportion of enzyme preparation required, based on the starch, will depend upon the kind and strength of the enzyme preparation, the kind of starch used, the degree of paste thinning desired, and other factors. Usually, however, the required amount of enzyme will lie within the range of about 0.2 to 2.0 per cent based on the starch.

The enzymes used should be active at the temperature at which the starches swell enough with water to permit rapid degradation of the swollen granules by the enzymes, and preferably they should be capable of being inactivated when heated to higher temperatures, e. g., to about 200 to 210° F. The different enzyme preparations usually vary somewhat in regard to the temperature at which they exhibit maximum activity, i. e., maximum rate of thinning the starch paste. Preferably this should coincide with the enzyme converting temperature of the starch, but useful results can be obtained, with the commercially available starch-liquefying enzyme preparations, even though this temperature lies considerably above or below the converting temperature. This is due to the fact that the enzyme preparations possess substantial activity over fairly wide temperature ranges that are broad enough, in general, to include the converting temperatures of all the starches in a given mixture. Superior results may be obtained by using a mixture of enzymes having optimum converting temperatures coinciding with the converting temperatures of the components in the starch mixture.

In general, the enzyme preparations useful in practicing this invention are most active at pH values lying within the range of about 5 to 7. Also, as a rule, best results are obtained if the conversion pH is adjusted upward as the converting temperature is raised. Useful results may be obtained, however, at pH values somewhat removed from the range of 5 to 7, especially if an enzyme preparation is selected whose optimum conversion pH lies as near as possible to the desired operating pH.

The enzyme-converting temperature of a starch may be lowered by suitable treatment or modification of the starch granules. Among these methods are milling on differential rolls mentioned earlier, controlled heating with water in the presence of swelling retarders, as described in United States Patents Nos. 2,121,502 and 2,124,372, and controlled treatment with strong alkali, followed by neutralization of the alkali, as described in United States Patents Nos. 785,216; 847,658; 847,985; 984,483; and 1,773,056. Additional methods of lowering the pasting temperature of a starch are known to those skilled in the art.

The proportions of starches having different enzyme-converting temperatures in the mixture used may be varied widely. When using natural starches only, which do not swell appreciably in cold water, best results are obtained with about equal proportions of the starches. If, however, there is mixed with a natural starch a modified one that swells to a considerable degree in cold water, it will be found desirable to use less modified than unmodified starch, otherwise the initial slurry of starches and cold water may become undesirably viscous. This is especially true if the ratio of starch solids to water in the slurry exceeds a value of about 0.30. At these high concentrations of starch solids, it will be found desirable to use only about one part of modified starch to about two parts of natural starch. At ratios of starch solids to water increasingly less than 0.30, the proportion of modified starch may be increased until it equals the proportion of the unmodified kind.

The maximum percentage of a starch with a given enzyme-converting temperature, based on the total mixture, that can be present without creating excessive thickening at some stage of the conversion will depend upon many factors. For example, it decreases with decreasing activity and proportion of enzyme, and with decreasing ratio of water to starch solids in the mixture.

The present invention is more specifically illustrated by the following examples in which all parts are by weight unless otherwise specified.

Example No. 1

Fifty parts of tapioca starch and 50 parts of corn starch, each containing about 12 per cent moisture, were slurried with 200 parts of water and 1.5 parts of a commercial solid starch-liquefying enzyme preparation in a steam jacketed vessel equipped with a mechanical stirrer. The slurry was adjusted to about 6.7 pH with acid or alkali as required. The stirred slurry was heated to about 150° F. by admitting steam to the steam jacket, held there for about 10 minutes, then it was heated to about 165° F. and held there for about 15 minutes, and finally it was heated to about 200° F. to inactivate the enzyme.

Although the mixture became quite viscous at times, it was always stirrable and finally became quite fluid, despite the high ratio of water to starch solids present. At no time did it set up to a solid, practically non-stirrable gel, as it would have done if either starch were used alone at the same ratio of starch solids to water.

Example No. 2

Sixty-five parts of ordinary corn starch and 35 parts of the same kind of starch, milled on differential rolls, each containing about 12 per cent moisture, were slurried with 200 parts of water and 1.5 parts of a commercial solid starch-liquefying enzyme preparation in a steam jacketed vessel equipped with a mechanical stirrer. The slurry of mixed starches, water, and enzyme was adjusted to a pH of about 6.7 with acid or alkali as required. The stirred slurry was heated to about 150° F. by admitting steam to the steam jacket, held there for about 15 minutes, then it was heated to about 165° F. and held there for another 15 minutes, and finally it was rapidly heated to about 200° F. to inactivate the enzyme.

This mixture was stirrable at all times during the conversion period, and yielded a fluid final paste.

Example No. 3

Fifty parts of tapioca starch and 50 parts of rice starch, each containing about 12 per cent moisture, were slurried with 200 parts of water and 1.5 parts of a commercial solid starch-liquefying enzyme preparation in a steam jacketed vessel equipped with a mechanical stirrer. The enzyme preparation was derived from bacteria and was capable of thinning starch pastes at temperatures as high as 175° F. The slurry was adjusted to a pH of about 6.7 with acid or alkali as required. The stirred slurry was heated to about 150° F. with the steam jacket, held there for about 10 minutes, then it was heated to about 175° F. and held there for about 15 minutes, and finally it was heated to about 210° F. to inactivate the enzyme.

The slurry was stirrable at all times during the enzyme conversion, and the final starch paste thus produced was satisfactorily fluid.

Example No. 4

Fifty parts of tapioca starch and 50 parts of corn starch, each containing about 12 per cent moisture, were slurried with 200 parts of water and 1.5 parts of a commercial solid starch-liquefying enzyme preparation in a steam jacketed kettle equipped with a mechanical stirrer. The slurry was adjusted to a pH of about 6.7 with acid or alkali as required, and heated, with stirring, to a temperature of about 150 F. Then the temperature of the stirred mixture was raised at a uniform rate to about 165° F. over a period of about 30 minutes. Immediately thereafter the paste was quickly heated to about 200° F. to inactivate the enzyme.

This procedure sacrifices some of the viscosity-reduction advantages in the stepwise heating process, but it does have the advantage of being simpler to carry out and of being especially adaptable to large scale operations where heating of large quantities of starch paste requires an appreciable length of time.

Example No. 5

Corn starch was modified by heating with water and hexalin according to the procedure disclosed in United States Patent No. 2,121,502. Fifty parts of this modified starch and fifty parts of natural corn starch, each of which starches contains about 12 per cent moisture, were slurried with 200 parts of water and 1.5 parts of a commercial starch-liquefying enzyme preparation in a steam jacketed vessel equipped with a mechanical stirrer. The slurry was adjusted to a pH of about 6.7 with acid or alkali as required. It was then heated, with stirring, to about 140° F., the enzyme converting temperature of the modified starch, and held at that temperature for about 15 minutes.

Next it was heated to about 165° F., the enzyme-converting temperature of the natural corn starch, and held there for another 15 minutes. Lastly it was quickly heated to about 200° F. to inactivate the enzyme.

Inactivation of the enzyme after it has thinned the starch paste is usually preferred, because otherwise the thinning and degradation of the starch may continue to an undesirable extent. In some applications of the thinned starch paste, continued action of the enzyme on the starch may not be harmful, and in others the mode of application may check the enzyme action before it has progressed too far. That is, enzyme inactivation may or may not be desirable or necessary for a given use of the thinned starch paste, but in no case is it essential to the preparation of that paste.

While certain preferred and illustrative embodiments of the invention have been described hereinabove, it is to be understood that the invention is not limited to the exact details described and that various changes may be made without departing from the scope of the appended claims. For example, it is possible to so control the milling of starch on differential rolls that only about half of the granules are modified. The resulting product will then correspond to a mixture of about equal parts of unmodified starch and completely modified starch, and can be satisfactorily used in the preparation of fluid concentrated pastes by enzyme conversion.

It will thus be seen that the objects hereinbefore set forth may readily and efficiently be attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of preparing an enzyme-thinned starch paste which comprises providing a slurry of water, starch-liquefying enzyme, and a plurality of starches modified in such manner that their enzyme-converting temperatures are lowered around 15° F., said starches being so selected that there is a difference between the enzyme-converting temperatures of every pair thereof, heating the slurry to the enzyme-converting temperature of the starch having the lowest enzyme-converting temperature, maintaining the slurry temperature at this value until the corresponding starch has been thinned by the enzyme, raising the temperature of the slurry to the enzyme-converting temperature of the starch having the next higher enzyme-converting temperature, maintaining the slurry at the elevated temperature until the corresponding starch has been thinned by the enzyme, but below the inactivation temperature of the enzyme, until the starches therein have been progressively thinned by the enzyme.

2. The method of preparing an enzyme-thinned starch paste which comprises providing a slurry of water, starch-liquefying enzyme, and a plurality of starches modified in such manner that their enzyme-converting temperatures are lowered around 15° F., said starches being so selected that there is a difference between the enzyme converting temperatures of every pair thereof, heating the slurry to the enzyme-converting temperature of the starch having the lowest enzyme-converting temperature, then slowly raising the temperature of the slurry to the enzyme-converting temperature of the starch having the highest enzyme-converting temperature, and continuing the heating of the slurry, at a temperature below the inactivation temperature of the enzyme, until the starches therein have been thinned by the enzyme.

3. The method of preparing an enzyme-thinned starch paste which comprises providing a slurry of water, starch-liquefying enzyme, corn starch, and tapioca starch, heating the slurry to the enzyme-converting temperature of the tapioca starch, maintaining the slurry temperature at this value until the tapioca starch has been thinned by the enzyme, raising the temperature of the slurry to the enzyme-converting temperature of the corn starch, and continuing the heating of the slurry, at a temperature below the inactivation temperature of the enzyme until the starches therein have been thinned by the enzyme.

4. The method of preparing an enzyme-thinned starch paste which comprises providing a slurry of water, starch-liquefying enzyme, natural corn starch, and corn starch so modified that its enzyme-converting temperature has been lowered around 15° F., heating the slurry to the enzyme-converting temperature of the modified corn starch, maintaining the slurry temperature at this value until the modified corn starch has been thinned by the enzyme, raising the slurry temperature to the enzyme-converting temperature of the natural corn starch, and continuing the heating of the slurry, at a temperature below the inactivation temperature of the enzyme, until the starches therein have been thinned by the enzyme.

5. The method of preparing an enzyme-thinned starch paste which comprises providing a slurry of water, starch-liquefying enzyme, natural corn starch, and corn starch modified by being milled on differential rolls at a temperature below its pasting temperature, whereby its enzyme-converting temperature is lowered around 15° F., heating the slurry to the enzyme-converting temperature of the milled starch, maintaining the slurry temperature at this value until the milled starch has been thinned by the enzyme, raising the slurry temperature to the enzyme-converting temperature of the natural corn starch, and continuing the heating of the slurry, at a temperature below the inactivation temperature of the enzyme, until the starches therein have been thinned by the enzyme.

6. The method of preparing an enzyme-thinned starch paste which comprises providing a slurry of water, starch-liquefying enzyme, corn starch, and tapioca starch, heating the slurry to the enzyme-converting temperature of the tapioca starch, then slowly raising the temperature of the slurry to the enzyme-converting temperature of the corn starch, and continuing the heating of the slurry, at a temperature below the inactivation temperature of the enzyme, until the starches therein have been thinned by the enzyme.

7. The method of preparing an enzyme-thinned starch paste which comprises providing a slurry of water, starch-liquefying enzyme, natural corn starch, and corn starch so modified that its enzyme-converting temperature has been lowered around 15° F., heating the slurry to the enzyme-converting temperature of the modified starch, then slowly raising the slurry temperature to the enzyme-converting temperature of the natural corn starch, and continuing the heating of the slurry, at a temperature below the inactivation temperature of the enzyme, until the starches have been thinned by the enzyme.

8. The method of preparing an enzyme-thinned starch paste which comprises providing a slurry of water, starch-liquefying enzyme, natural corn starch, and corn starch modified by being milled on differential rolls at a temperature below its pasting temperature, whereby its enzyme-converting temperature is lowered around 15° F., heating the slurry to the enzyme-converting temperature of the milled starch, then slowly raising the slurry temperature to the enzyme-converting temperature of the natural corn starch, and continuing the heating of the slurry, at a temperature below the inactivation temperature of the enzyme, until the starches therein have been thinned by the enzyme.

9. The method of preparing an enzyme-thinned starch paste which comprises providing a slurry of water, starch-liquefying enzyme, and a plurality of starches whose enzyme converting temperatures differ by at least around 15° F., heating the slurry to the enzyme-converting temperature of the starch having the lowest enzyme-converting temperature, maintaining the slurry temperature at this value until the corresponding starch has been thinned by the enzyme, raising the temperature of the slurry to the enzyme-converting temperature of the starch having the next higher enzyme-converting temperature, maintaining the slurry at the elevated temperature until the corresponding starch has been thinned by the enzyme, but below the inactivation temperature of the enzyme, until the starches therein have been progressively thinned by the enzyme.

10. The method of preparing an enzyme-thinned starch paste which comprises providing a slurry of water, starch-liquefying enzyme, and a plurality of starches at least one of which chemically has been modified in such manner that its enzyme-converting temperature has been lowered around 15° F., heating the slurry to the enzyme-converting temperature of the chemically modified starch, then slowly raising the temperature of the slurry to the enzyme-converting temperature of the starch having the highest enzyme-converting temperature, and continuing the heating of the slurry, at a temperature below the inactivation temperature of the enzyme, until the starches therein have been thinned by the enzyme.

11. The method of preparing an enzyme-thinned starch paste which comprises providing a slurry of water, starch-liquefying enzyme, and a plurality of starches at least one of which mechanically has been modified in such manner that its enzyme-converting temperature has been lowered around 15° F., heating the slurry to the enzyme-converting temperature of the mechanically modified starch, then slowly raising the temperature of the slurry to the enzyme-converting temperature of the starch having the highest enzyme-converting temperature, and continuing the heating of the slurry, at a temperature below the inactivation temperature of the enzyme, until the starches therein have been thinned by the enzyme.

JAMES P. CASEY.

REFERENCES CITED

The following references are of record in the file of this patent:

UNITED STATES PATENTS

| Number | Name | Date |
| --- | --- | --- |
| 2,175,486 | Singer | Oct. 10, 1938 |
| 2,364,590 | Schopmeyer et al. | Dec. 5, 1944 |